Patented Sept. 7, 1937

2,092,725

UNITED STATES PATENT OFFICE 2,092,725

ALKYL-BROMO-HYDROXY-DIPHENYLS

Edgar C. Britton, Gerald H. Coleman, and Lindley E. Mills, Midland, Mich., assignors to The Dow Chemical Company, Midland, Mich., a corporation of Michigan No Drawing. Application October 15, 1936, Serial No. 105,798

16 Claims. (Cl. 260—154)

This invention concerns bromo-hydroxy-diphenyl compounds substituted with at least one branched-chain alkyl group. The expression "branched-chain", as herein used, refers to any alkyl group which is secondary-, iso-, or tertiary- in configuration, e. g. secondary-propyl, iso-butyl, tertiary-amyl, iso-hexyl, secondary-heptyl, tertiary-octyl, etc. We have prepared members of the above new class of compounds, determined certain of their physical properties whereby they can be readily identified and have found them useful as microbicides, antiseptics, preservatives, intermediates, etc.

These compounds are for the most part viscous, high-boiling, water-white liquids, although some of them show a tendency to crystallize on prolonged standing. They are substantially insoluble in water, but somewhat soluble in dilute alkaline solutions and most organic solvents.

The preparation of our new compounds can be accomplished by the direct bromination of a branched-chain-alkyl hydroxy-diphenyl. For example, an alkyl-hydroxy-diphenyl, such as 5-isopropyl-2-hydroxy-diphenyl, is warmed to a temperature at which it is sufficiently fluid to be stirred, and the theoretical amount of bromine thereafter introduced below the surface thereof, the liquid being agitated throughout such addition. In carrying out the above direct bromination, the alkyl-hydroxy-diphenyl compound may be dissolved or suspended in chlorobenzene, ethylene-dichloride, water, or other inert solvent, and bromination catalysts such as metallic iron, iodine, etc., may be employed, although not necessarily. Following completion of the bromination step, dissolved hydrogen bromide is removed from the reaction mixture, which is then fractionally distilled to isolate the desired product.

These new compounds can also be prepared by reacting a bromo-hydroxy-diphenyl compound with an olefine containing at least 3 carbon atoms, or with a suitable alkyl-halide or aliphatic alcohol in the presence of a catalyst such as aluminum chloride, aluminum bromide, iron chloride, etc. For example, a bromo-hydroxy-diphenyl compound, such as 3-bromo-2-hydroxy-diphenyl, is warmed to a suitable temperature, usually between about 75° and 175° C., and the olefine, alkyl halide, etc., slowly added below the surface of the liquid reaction mixture with stirring. The reaction mixture is thereafter heated and stirred until the condensation is complete, i. e. until hydrogen halide is no longer evolved. After the reaction is completed the crude alkylated mixture is washed with dilute aqueous hydrochloric acid or water to decompose and remove residual catalyst, and the desired product separated, e. g. by fractional distillation in vacuo, etc.

Among other methods by which the compounds may be prepared are (1) by partial hydrolysis of suitable alkyl-dihalo-diphenyl derivatives, e. g. 2-tertiary-butyl-4,4'-dibromo-diphenyl, 2,3-dibromo-5-secondary-amyl-diphenyl, 3,4-dibromo-5-isopropyl-diphenyl, etc.; (2) by diazotization of suitable alkylated bromo-amino-diphenyls, e. g. 2-isopropyl-4-amino-6-bromo-diphenyl, 2-amino-3-octyl-5-bromo-diphenyl, etc., and decomposition of the resulting diazonium compounds with aqueous alkali; (3) by the esterification of the bromo-hydroxy-diphenyls with branched-chain aliphatic organic acids, rearrangement of such esters with anhydrous aluminum chloride, and reduction of the resulting ketonic bodies.

The following examples describe in detail the preparation of certain individual members of our new class of compounds but are not to be construed as limiting the invention:

*Example 1.—2-hydroxy-3-tertiary-amyl-5-bromo-diphenyl*

A mixture of 159 grams (0.638 mol.) of 2-hydroxy-5-bromo-diphenyl and 5.3 grams (0.04 mol.) of finely divided anhydrous aluminum chloride ($AlCl_3$) was heated to a temperature of 98° C. and 40.5 grams (0.38 mol.) of 2-chloro-2-methyl butane was slowly introduced with stirring below the surface of the reaction mixture at a substantially uniform rate over a period of 30 minutes. Thereafter the reaction mixture was maintained for 5 minutes at 100° C. with stirring, diluted with an excess of ethylene dichloride, washed with water to remove catalyst, and fractionally distilled under vacuum, the yield being 51.5 grams (0.162 mol.) of a 2-hydroxy-3-tertiary-amyl-5-bromo-diphenyl product. This compound is a viscous water-white liquid boiling at 160°–163° C. at 1 millimeter's pressure and having a specific gravity of 1.248 at 20°/4° C.

*Example 2.—3-bromo-4-hydroxy-5-tertiary-butyl-diphenyl*

In a similar manner 498 grams (2 mols) of 3-bromo-4-hydroxy-diphenyl, 92.5 grams (1 mol.) of 2-chloro-2-methyl-propane, and 13.5 grams (0.1 mol.) of anhydrous aluminum chloride were reacted together at a temperature of 98°–103° C. over a period of 2 hours, thereby yielding on fractional distillation, 256 grams (0.84 mol.) of a 3-bromo-4-hydroxy-5-tertiary-butyl-diphenyl product as a viscous liquid. Upon careful fractionation, this compound was found to have a boiling point of 173°–174° C. at 2 millimeters' pressure. On prolonged standing the purified product crystallized out and was found to have a melting point of 104° C. on recrystallization from petroleum ether.

*Example 3.—2-hydroxy-3-bromo-5-tertiary-butyl-diphenyl*

113 grams (0.5 mol.) of 2-hydroxy-5-tertiary-butyl-diphenyl, boiling at 133°–135° C. at 3 millimeters' pressure, was dissolved in 300 grams of carbon tetrachloride and 81.5 grams (0.51 mol.) of liquid bromine reacted therewith over a period of 40 minutes at a temperature of 32°–34° C. The reacted mixture was thereafter washed with water to remove dissolved hydrogen bromide, and the carbon tetrachloride separated therefrom by distillation at atmospheric pressure. The residue from the above preliminary distillation was fractionally distilled under vacuo whereby there was obtained 113 grams (0.403 mol.) of a 2-hydroxy-3-bromo-5-tertiary-butyl-diphenyl product. This compound is a water-white viscous liquid boiling at approximately 175° C. at 3 millimeters' pressure and having a specific gravity of 1.130 at 20°/4° C.

*Example 4.—2-hydroxy-3-(alpha-beta-dimethyl-propyl)-5-bromo-diphenyl*

194 grams (0.78 mol.) of 2-hydroxy-5-bromo-diphenyl and 41.5 grams (0.39 mol.) of iso-amyl-chloride were reacted together in the usual manner in the presence of 5.2 grams (0.04 mol.) of anhydrous aluminum chloride. The iso-amyl-chloride was added to a mixture of the phenol compound and catalyst over a period of 0.75 hour at temperatures ranging between 99° and 131° C. Following said addition, the reaction mixture was stirred and maintained at 131°–135° C. for 2 hours, thereafter diluted with ethylene dichloride, washed successively with 6N-hydrochloric acid solution and water, and fractionally distilled, whereby a 2-hydroxy-3-(alpha-beta-dimethyl-propyl)-5-bromo-diphenyl product was obtained, the major portion of which boiled at approximately 160° C. at 2 millimeters' pressure.

*Example 5.—Secondary-butyl-bromo-3-hydroxy-diphenyl*

In a similar manner 140 grams (0.562 mol.) of brominated 3-hydroxy-diphenyl boiling at 184°–188° C. at 10 millimeters' pressure and 23.1 grams (0.25 mol.) of secondary-butyl-chloride were reacted together in the presence of 3.3 grams (0.025 mol.) of anhydrous aluminum chloride. The secondary-butyl-chloride was added with stirring to a mixture of the phenol compound and catalyst over a period of 15 minutes at a temperature of 95°–97° C. The heating and stirring was continued for 35 minutes thereafter, at the end of which time the evolution of hydrogen halide gas from the reaction mixture had substantially ceased. The product was then washed with 6N hydrochloric acid solution and thereafter with water. The resulting reaction product was a thick viscous oil substantially insoluble in water but somewhat soluble in dilute sodium hydroxide solution. Distillation under reduced pressure indicated that the desired secondary-butyl-bromo-3-hydroxy-diphenyl compound was present with an excess of unreacted bromo-3-hydroxy-diphenyl but was difficultly separable therefrom.

The mixed reaction products formed in the foregoing examples may be advantageously utilized as antiseptics, etc., without separating therefrom the branched-chain alkyl-bromo-hydroxy-diphenyl constituents. Such mixtures are viscous high-boiling liquids soluble in dilute aqueous and alcoholic alkaline solutions and most organic solvents.

In a similar manner other alkyl-bromo-hydroxy-diphenyl compounds may be prepared. For example, by the bromination of the corresponding branched-chain alkyl-hydroxy-diphenyl compounds, 3-bromo-4-hydroxy-6-tertiary hexyl-diphenyl, 3,5-dibromo-4-hydroxy-6-iso-propyl-diphenyl, 3-hydroxy-4-bromo-6-secondary-amyl-diphenyl, 2-hydroxy-3-bromo-5-tertiary-octyl-diphenyl, etc., are prepared.

Similar compounds in which bromine is attached to the non-hydroxylated benzene ring result from (1) the branched-chain alkylation of compounds such as 4-hydroxy-4'-bromo-diphenyl, 2-hydroxy-3,4'-dibromo-diphenyl, etc., to form mono- and dialkyl derivatives thereof, and (2) the direct bromination of alkyl-hydroxy-diphenyls in the presence of suitable catalysts such as iron bromide iodine, antimony pentachloride, etc. The bromination of compounds having branched-chain alkyl-substituents in the non-hydroxylated benzene ring forms compounds such as 3,5-dibromo-4-hydroxy-4'-tertiary-octyl-diphenyl, and 2-hydroxy-5-bromo-4'-isopropyl-diphenyl, which are included within the scope of this invention.

Other modes of applying the principle of our invention may be employed instead of those explained, change being made as regards the materials employed, provided the products described in the following claims be thereby obtained.

We therefore particularly point out and distinctly claim as our invention:—

1. A branched-chain alkyl-bromo-hydroxy-diphenyl.

2. A branched-chain alkyl-bromo-hydroxy-diphenyl in which the alkyl and bromo substituents are attached to the hydroxylated benzene ring.

3. A branched-chain alkyl-bromo-hydroxy-diphenyl in which at least one alkyl group and one bromine are attached to the hydroxylated benzene ring.

4. A branched-chain alkyl-bromo-hydroxy-diphenyl in which the alkyl substituent contains from 3 to 8 carbon atoms inclusive.

5. A mono- branched-chain alkyl-bromo-hydroxy-diphenyl in which the alkyl group is attached to the hydroxylated benzene ring and contains not more than 8 carbon atoms.

6. A mono- branched-chain alkyl-mono-bromo-hydroxy-diphenyl.

7. A mono- branched-chain alkyl-mono-bromo-hydroxy-diphenyl in which the alkyl group and bromine are attached to the hydroxylated benzene ring.

8. A mono- branched-chain alkyl-mono-bromo-hydroxy-diphenyl in which the alkyl group contains not more than 8 carbon atoms.

9. A mono- branched-chain alkyl-mono-bromo-hydroxy-diphenyl in which the alkyl group contains not more than 8 carbon atoms and is attached to the hydroxylated benzene ring.

10. A mono- branched-chain alkyl-mono-bromo-hydroxy-diphenyl in which the alkyl group contains not more than 8 carbon atoms and the alkyl and bromo substituents are attached to the hydroxylated benzene ring.

11. Mono- branched-chain alkyl-mono-bromo-2-hydroxy-diphenyl.

12. Mono- branched-chain butyl-mono-bromo-hydroxy-diphenyl.

13. Mono-tertiary-butyl-mono-bromo-hydroxy-diphenyl.

14. 3-bromo-4-hydroxy-5-tertiary-butyl-diphenyl.

15. 2-hydroxy-3-bromo-5-tertiary-butyl-diphenyl.

16. 2-hydroxy-3-tertiary-hexyl-5-bromo-diphenyl.

EDGAR C. BRITTON.
GERALD H. COLEMAN.
LINDLEY E. MILLS.